(12) United States Patent
Bansal et al.

(10) Patent No.: US 10,349,237 B2
(45) Date of Patent: *Jul. 9, 2019

(54) APPARATUS AND METHOD FOR PROVIDING ENHANCED TELEPHONIC COMMUNICATIONS

(71) Applicant: AT&T Intellectual Property I, L.P., Atlanta, GA (US)

(72) Inventors: Ankur Bansal, Fremont, CA (US); Javier Gerardo Arboleda, San Jose, CA (US); Matthew Anthony Bojorquez, Livermore, CA (US); Cameron Broome, San Ramon, CA (US); Amber Lynette Browning, San Ramon, CA (US); Sunija Christelda, San Ramon, CA (US); Brian Comilang, Alameda, CA (US); Khine Htun, Livermore, CA (US); Abraar Hussain, Princeton, NJ (US); Sasha Ng, Union City, CA (US); Nimisha Shah, Milipitas, CA (US); Michael Siruno, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/860,110

(22) Filed: Jan. 2, 2018

(65) Prior Publication Data
US 2018/0124581 A1 May 3, 2018

Related U.S. Application Data

(63) Continuation of application No. 15/229,344, filed on Aug. 5, 2016, now Pat. No. 9,877,175, which is a
(Continued)

(51) Int. Cl.
*H04W 4/02* (2018.01)
*H04W 4/18* (2009.01)
(Continued)

(52) U.S. Cl.
CPC ............... *H04W 4/18* (2013.01); *G10L 15/26* (2013.01); *H04B 17/318* (2015.01); *H04W 4/023* (2013.01); *H04W 4/14* (2013.01)

(58) Field of Classification Search
CPC .. H04M 3/567; H04M 3/568; H04M 1/72552; H04M 2203/651; G10L 15/26;
(Continued)

(56) References Cited

U.S. PATENT DOCUMENTS 5,003,574 A 3/1991 Denq
6,816,468 B1 11/2004 Cruickshank
(Continued)

OTHER PUBLICATIONS

Federal Communications Commissio, "Internet Protocol (IP) Captioned Telephone Service", http://www.fcc.gov/guides/internet-protocol-ip-captioned-telephone-service, Oct. 4, 2011.

*Primary Examiner* — Timothy X Pham
(74) *Attorney, Agent, or Firm* — Guntin & Gust, PLC; Ralph Trementozzi

(57) ABSTRACT

A system that incorporates teachings of the present disclosure may include, for example, a device that facilitates presentation of a textual transcription of an audio portion of an active voice call between a first communication device and a second communication device on a first display device. A presence of the first communication device being nearby local device is detected during the active voice call. In response to the detecting of the presence, the facilitating of the presentation of the textual transcription on the first display device is discontinued, wherein the textual transcrip-
(Continued)

tion is provided to the local device for presentation on a second display device. Other embodiments are disclosed.

20 Claims, 6 Drawing Sheets

Related U.S. Application Data continuation of application No. 14/513,645, filed on Oct. 14, 2014, now Pat. No. 9,472,191, which is a continuation of application No. 13/280,745, filed on Oct. 25, 2011, now Pat. No. 8,886,169.

(51) Int. Cl.
*G10L 15/26* (2006.01)
*H04B 17/318* (2015.01)
*H04W 4/14* (2009.01)

(58) Field of Classification Search
CPC ....... G10L 13/00; G10L 13/043; G10L 15/30; G10L 2021/105; H04L 12/1813; H04L 29/06027; H04L 29/1216; H04L 51/04; H04L 51/066
USPC ..................................................... 455/412.2
See application file for complete search history.

(56) References Cited

U.S. PATENT DOCUMENTS

| | | |
|---|---|---|
| 7,072,684 B2 | 7/2006 | Gusler |
| 7,133,513 B1 | 11/2006 | Zhang |
| 7,715,873 B1* | 5/2010 | Biere .................... H04M 19/04 455/418 |
| 8,542,802 B2 | 9/2013 | Olligschlaeger |
| 2005/0198096 A1 | 9/2005 | Shaffer et al. |
| 2007/0049255 A1* | 3/2007 | Bhakta ................. H04W 88/02 455/412.2 |
| 2007/0188657 A1 | 8/2007 | Basson et al. |
| 2008/0045198 A1 | 2/2008 | Bhogal et al. |
| 2008/0198978 A1 | 8/2008 | Olligschlaeger |
| 2009/0299743 A1 | 12/2009 | Rogers |
| 2010/0136923 A1* | 6/2010 | Rofougaran ......... H04B 1/3805 455/73 |
| 2010/0150333 A1 | 6/2010 | Goodman et al. |
| 2010/0228546 A1 | 9/2010 | Dingler et al. |
| 2012/0282906 A1 | 11/2012 | Frye |
| 2015/0051908 A1* | 2/2015 | Romriell ............... G06F 17/273 704/235 |
| 2016/0345147 A1 | 11/2016 | Hussain et al. |

* cited by examiner

100

APPARATUS AND METHOD FOR PROVIDING ENHANCED TELEPHONIC COMMUNICATIONS

CROSS-REFERENCE TO RELATED APPLICATION(S)

This application is a continuation of U.S. application Ser. No. 15/229,344, filed Aug. 5, 2016, which is a continuation of U.S. application Ser. No. 14/513,645, filed Oct. 14, 2014 (now U.S. Pat. No. 9,472,191), which is a continuation of U.S. application Ser. No. 13/280,745, filed Oct. 25, 2011 (now U.S. Pat. No. 8,886,169), which are incorporated by reference herein in their entirety.

FIELD OF THE DISCLOSURE

The present disclosure relates generally to telecommunications and more specifically to an apparatus and method for providing enhanced telephonic communications.

BACKGROUND

Telephonic communications remain central to the growth of the telecommunications industry. Many consumers demand features that enhance traditional voice-based telephony. Useful enhancements allow consumers to enjoy telecommunication features regardless of physical impairments. Consumers increasingly desire the ability to relive and to share telecommunication experiences. Modern telecommunication networks benefit from interconnectivity between consumers and various communication devices. As network capabilities expand, these interconnections provide new opportunities to enhance telephonic communications.

DETAILED DESCRIPTION

Figure 1:
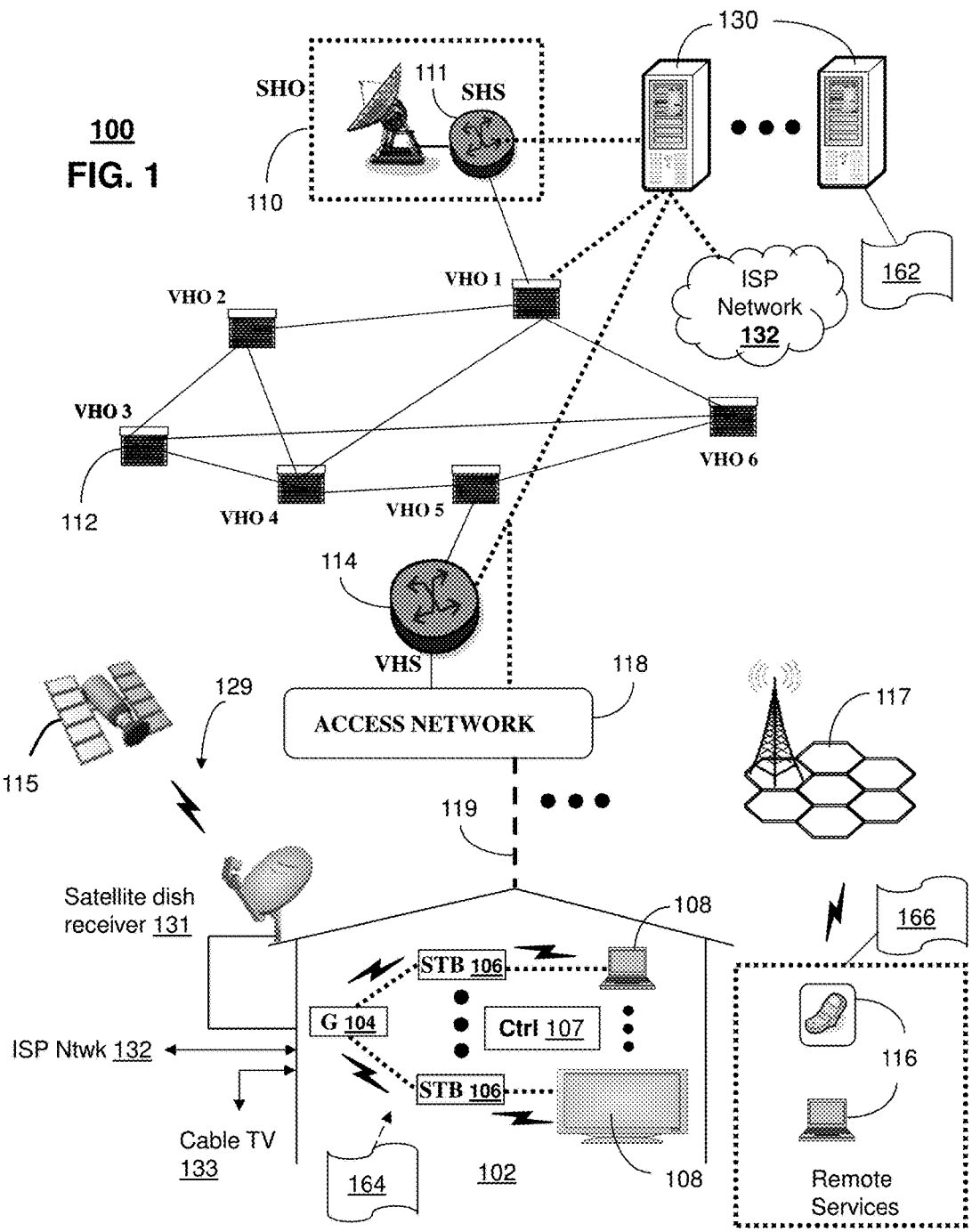
FIGS. 1-2 depict illustrative embodiments of communication systems that provide media services.

The present disclosure describes, among other things, illustrative embodiments for providing enhanced telephonic communications. In one embodiment, a text transcription of telephonic audio voice data is made available from a media processor device. Other embodiments are contemplated by the present disclosure.

One embodiment of the present disclosure includes a media processor device having a memory coupled to a processor. The processor can be operable to detect a call initiated by one of a first communication device or second communication device. The processor can also be operable to detect a presence of the first communication device in a vicinity of the media processor device. The processor can further be operable to present a prompt offering a transcription of audio voice data originating from the second communication device to a text transcription. The processor can be operable to receive the audio voice data originating from the second communication device responsive to a communication session established between the first and second communication devices. In turn, the processor can be operable to transcribe the audio voice data to the text transcription responsive to receiving an acceptance associated with the prompt. The processor can also be operable to present the text transcription on a display communicatively coupled to the media processor device.

One embodiment of the present disclosure includes a computer-readable storage medium including computer instructions, which, when executed by a processor, can cause the processor to receive media content over a communication network and to present the media content on a display. The computer instructions can also cause the processor to receive audio voice data originating from a telephony communication session including a first communication device and a second communication device. The computer instructions can further cause the processor to receive audio voice data originating from a telephony communication session established between a first communication device and a second communication device and to detect a presence of the first communication device in the vicinity of the display. In turn, the audio voice data can be caused to be transcribed to a text transcription responsive to detecting the presence of the first communication device. The computer instructions can cause the processor to present the text transcription on the display.

One embodiment of the present disclosure includes a method including receiving over a communication network audio voice data originating from a telephony communication session established between a first communication device and a second communication device and transcribing the audio voice data to a text transcription. The method can also include detecting a presence of a first communication device in the vicinity of a media processor device and presenting the text transcription on a display communicatively coupled to a media processor device in response to the detected presence of a first communication device.

FIG. 1 depicts an illustrative embodiment of a first communication system 100 for delivering media content. The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to any present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or mobile communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media server device 130. The media server device 130 can use common computing and communication technology to perform function 162, which includes among things, providing for enhanced telephonic communication by detecting a call initiated by communication devices, such as telephones or mobile phones, and by detecting a presence of a communication device in a vicinity of the media processor device 106. The media processor devices 106 can present a prompt at a media device 108, a media controller 107, mobile communication device 116, or other communication device, where the prompt includes an offering of a transcription of audio voice data originating from one or more of the communication devices participating in the call. The media processor devices 106 can receive the audio voice data originating from one or more of the communication devices and can transcribe this audio voice data to a text transcription responsive to receiving an acceptance associated with the prompt. The media processor devices 106 can cause the text transcription to be presented on a display communicatively coupled to the media processor device 206, or another display.

Figure 2:
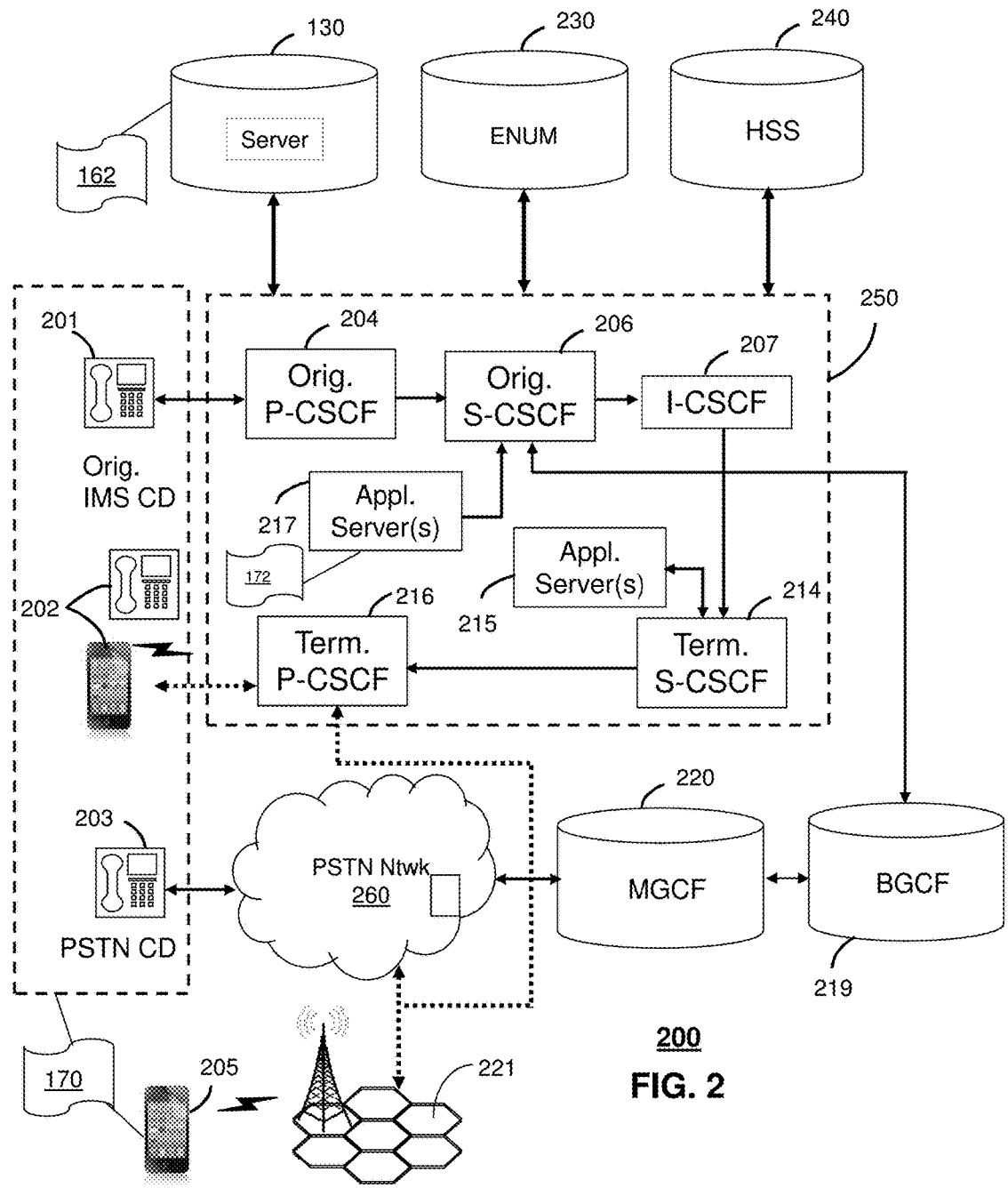

FIG. 2 depicts an illustrative embodiment of a communication system 200 employing Internet Protocol Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. For example, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

Communication system 200 can include or otherwise be coupled to the media server device 130 of FIG. 1 for purposes similar to those described above. The communication system 200 can include or otherwise be coupled to the media processor device 106 of FIG. 1 for purposes similar to those described above. It is further contemplated by the present disclosure that the media server device 130 and/or the media processor device 106 can perform the function 162 and thereby provide enhanced telephonic communications for subscribers associated with CDs 201, 202, 203, and 205. CDs 201, 202, 203, and 205 can be adapted with software to perform function 170 to utilize and integrate with the enhanced telephonic communications application performed by the media processor device 106. It is further contemplated that the media server device 130 can be an integral part of the application server(s) 217, where the application server(s) 217 performs function 172, which can be substantially similar to function 162 and adapted to the operation of the IMS network 250.

Figure 3:
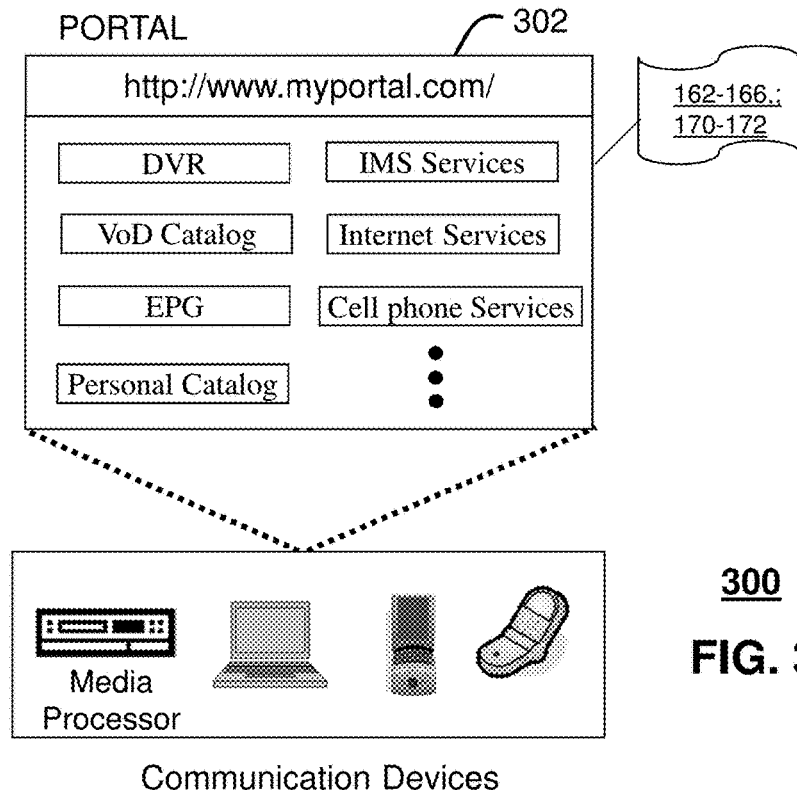
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
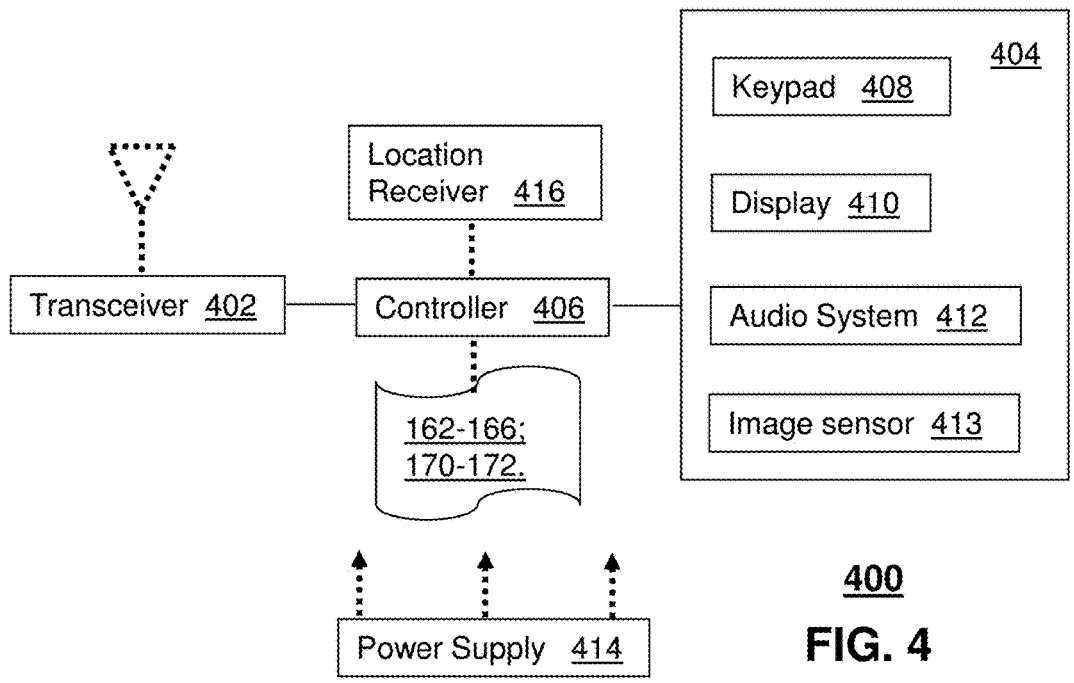
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the mobile communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

The communication device 400 can be adapted to perform the functions of the media processor 106, the media devices 108, or the mobile communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
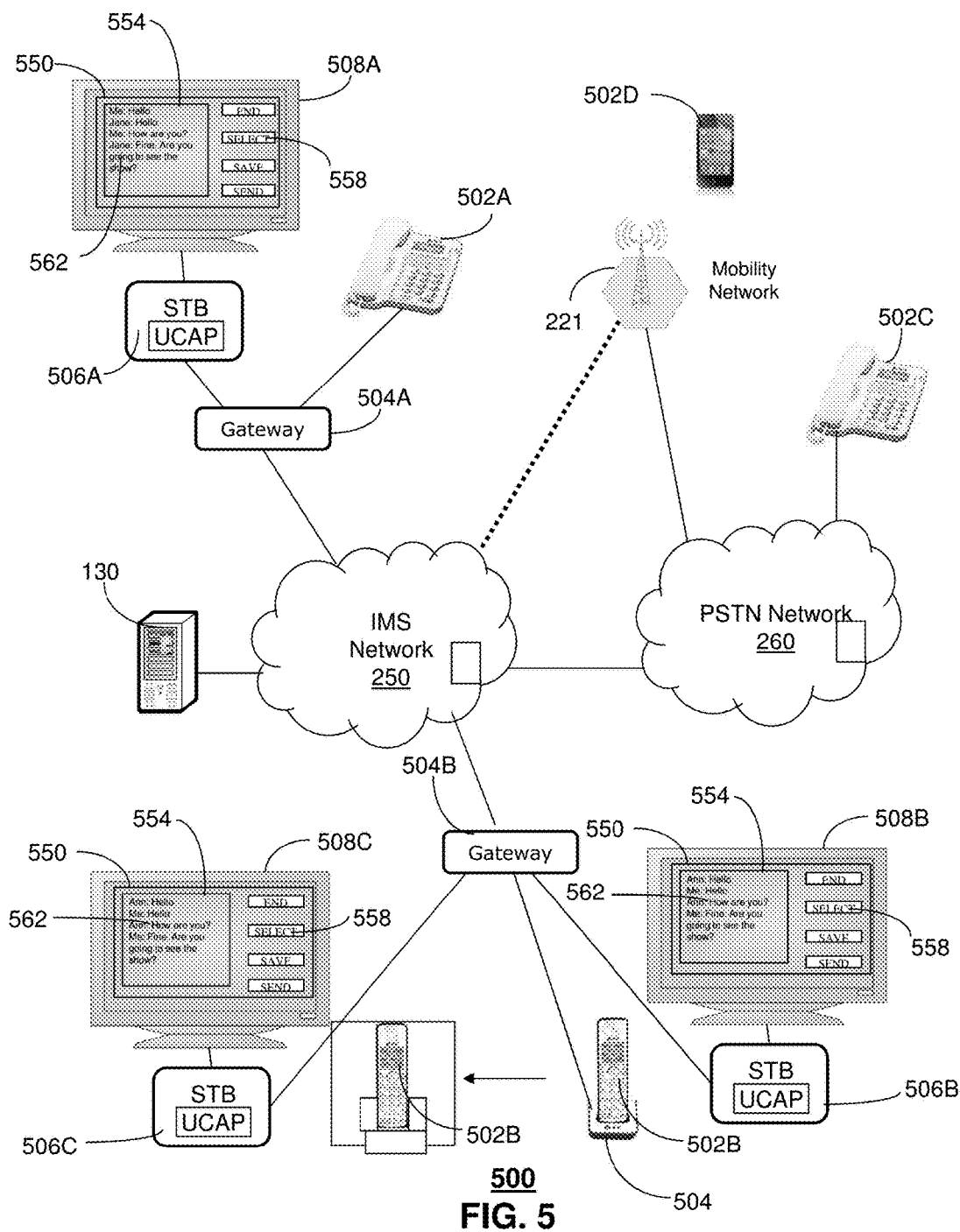
FIG. 5 depicts an illustrative embodiment of a communication system.

FIG. 5 depicts an illustrative embodiment of a communication system 500 for enhancing telephonic communications. System 500 can be overlaid or operably coupled to communication systems 100-200 as another representative embodiment of communication systems 100-200. System 500 can include a media server device 130 in communication with a packet switched network such as IMS network 250 and/or a circuit switched network such as a PSTN network 260 (see communication system 200 of FIG. 2). The media server device 130 can be in communication with media processor devices 506A-C (such as set-top boxes) through gateway devices 504A-B connected to the IMS network 250. The media server device 130 can provide media content to the media processor devices 506A-C. Communication devices 502A-D (such as wired and wireless telephones and mobile phones) can be coupled to the IMS network 250 though gateways 504A-B, including gateways that are shared with the media processor devices 506A-D. The communication devices 502A-D can use the packet switched network to transact communications, including telephonic sessions between the communication devices 502A-D. The communication devices 502A-D can also be coupled to the PSTN network 260. Communication devices 502A-D can conduct telephonic sessions that require use of both the IMS network 250 and the PSTN network 260. Communication devices 502A-D can include mobile or cellular phones that can be connected to the IMS network 250 or the PSTN network 260 using mobility networks 221, base stations, or femtocells. Communication device 502A-D can be connected to networks and gateways 504B by wired connections or wired connections.

The present disclosure contemplates media processor devices 506A-C that, among other things, can be used to detect a call initiated by one of the communication devices 502A-D. The media processor device 506A-C can also be used to detect a presence of a communication device 502B in a vicinity of a media processor device 506C. The media processor device 506A-C can be used to present a prompt offering a transcription of audio voice data originating from one or more of the communication devices 502A-D that is engaged in a call to thereby generate a text transcription. The media processor device 506A-C can be used to receive the audio voice data originating from one or more of the communication devices 502A-D responsive to a communication session established between the communication devices. In turn, the media processor device 506A-C can be used to transcribe the audio voice data to the text transcription responsive to receiving an acceptance associated with the prompt. The media processor device 506A-C can also be used to present the text transcription on a display communicatively coupled to the media processor device 506A-C. The media processor device 506A-C can thereby enhance telephonic communication according to the illustrative embodiments of method 600 of FIG. 6.

Figure 6:
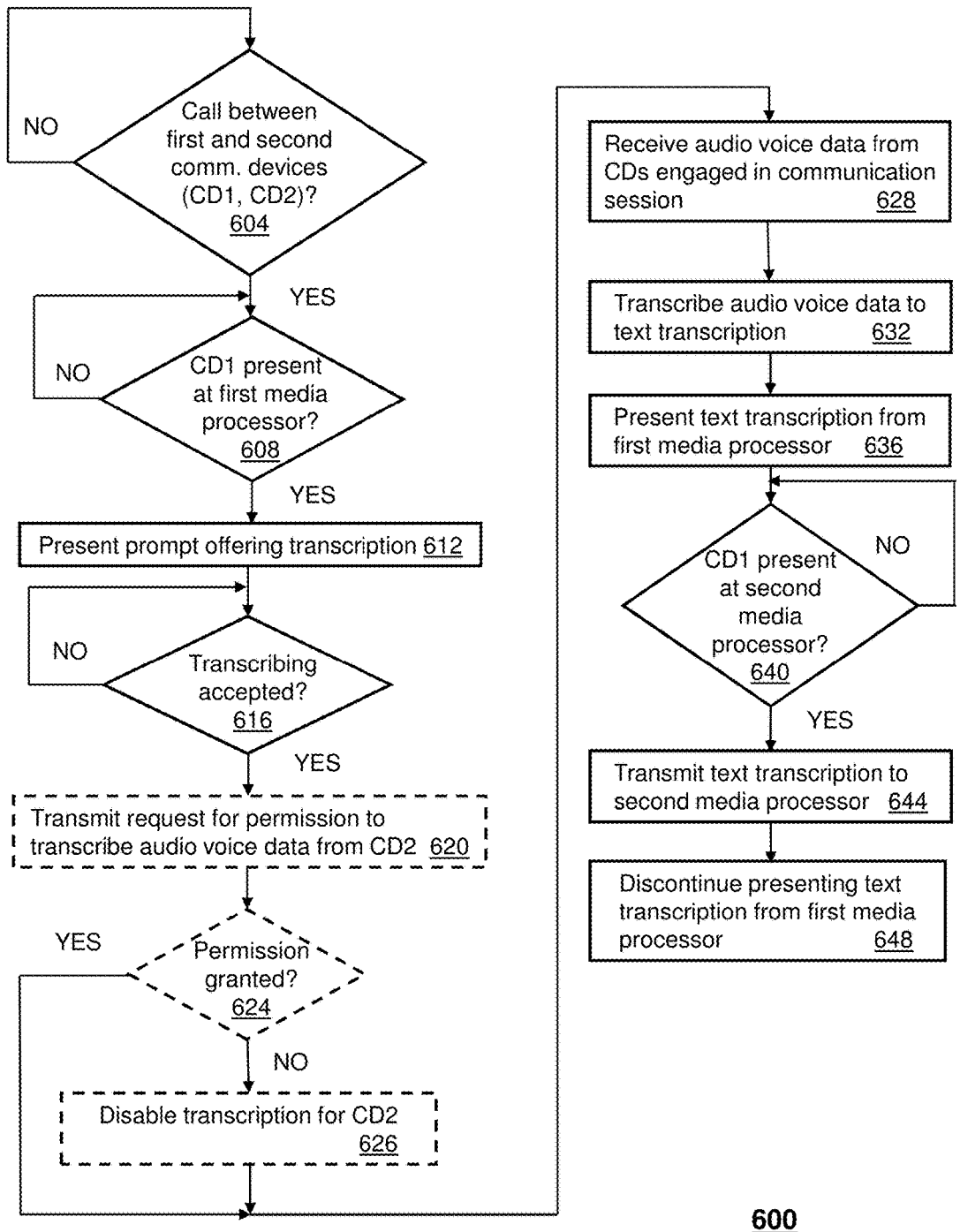
FIG. 6 depicts an illustrative embodiment of a method that can be used in portions of the communication systems described in FIGS. 1-5.

FIG. 6 depicts an illustrative method 600 that operates in portions of the devices of FIGS. 1-5. Method 600 can begin with step 604 in which a call can be detected between communication devices 502A-D. The call can be between a first communication device 502A and a second communication device 502B. The call can include additional communication devices 502C-D (such as in a conference call). The call can include communication devices 502A-B that are each connected directly to the IMS network 250 by way of gateways 504A-B or routers. In another embodiment, the call can include communication devices 502A-D communicatively coupled to each other by way of the PSTN network 260 and the IMS network 250 as described in FIG. 2.

In one embodiment, a communication device 502A can be connected to the IMS network 250 through a gateway 504A by a plain old telephone service (POTS) line supplied by a common RJ11 phone jack. In this case the communication device 502A can be a POTS-capable phone. At the gateway 504A, the communications signaling can be converted to packet switched so that the signaling is compatible with the IMS network 250. In one embodiment, the communication device 502A can be connected to the gateway 504A by a packet switched data line, or voice over internet protocol (VoIP) line. In this case, the communication device 506A can be a VoIP-capable phone and the router 504A can simply pass the packet switched signal to the IMS network 250. If the gateway 504A is providing a POTS signal to the communication device 502A, then this POTS signal can be made available to the media processor device 506A via another RJ11 phone jack. If the gateway 504A is providing a packet switched signal to the communication device 502A, then a packet switched signal such as a VoIP signal can also be provided to the media processor device 506A by a wired or wireless connection supplied by the gateway 504. A POTS-based call can be detected by a media processor device 506 via monitoring the POTS line for ring tones. A VoIP call can be detected by the media processor device 506A-C by monitoring for an internet message directed to the communication device 502A.

In one embodiment, one or more of the communication devices 502A-D is a mobile communication device (such as a cellular phone). If a mobile communication device is used, then the device can be in direct communication with a base station 221 of a mobility network such as shown in FIG. 2. The base station 221 can, in turn, communicate directly with the PSTN network 260, as shown, or can communicate directly with the IMS network 250. In one embodiment, a mobile communication device (such as communication device 502D) can be in communication with the IMS network 250 by way of a femtocell, not shown. The femtocell can be coupled to or integrated into the media processor device 506A. In this configuration, the media processor device 506A can monitor communications of the mobile communication device 502D as these communications are routed through the gateway 504A to the packet switched network. In this way, the media processor device 506A can detect calls and receive audio voice data associated with the mobile communication device 502D.

In one embodiment, the mobile communication device 502D can maintain communication through the base station 221 of the mobility network but can send copies of its communications to the media processor device 506A by way of a wireless connection such as Wi-Fi, Bluetooth, cellular, or another wireless access interface. The media processor device 506A can request copies of communications from the mobile communication device 502D or the base station 221, which can be delivered to the media processor device 506A via a cellular link (e.g., integrated femto, Internet connection, or other suitable means of communication).

If a call is determined to be initiated between two or more of the communication devices 506A-C, in step 604, then a check is performed to identify if one of the communication devices 502A-D engaged in the initiated call is present in the vicinity of a media processor device 506A-C. In one embodiment, a media processor device 506A-C can determine whether one of the engaged communication device 502A-D is present in the vicinity of the media processor device 506A-C by detecting a passive or active radio frequency identification device (RFID) tag that can be included with the communication device 502A-D. The RFID tag can be detected by means of a transmitter and an antenna in the media processor device 506A-C. If the RFID tag is detected, then media processor device 506A-C can read identifying information for the communication device 502A-D. The media processor device 506A-C can also detect a presence of a communication device by way of measuring an RSSI of the RF signal it receives from the communication device 502A-D. An antenna and a receiver can be included in the media processor device 506A-C and can detect a signal strength emanating from one of the communication devices 502(A).

If the media processor device 506A-D identifies that one of the communication devices 502A-D is in the vicinity of the media processor device 506, in step 608, then a prompt is presented offering a transcription of the call in step 612. In one embodiment, the media processor device 506A-C in the vicinity of the communication device 502A-D can present the prompt on a display 508A-C that is communicatively coupled to the media processor device 506A-C. For example, media processor device 506B can detect communication device 502B is in the vicinity of media processor 506B after a detection of a call involving communication device 502B. As a result, media processor device 506B causes a prompt 550 to be presented on the display 508B that is coupled to the media processor device 506B. The prompt 550 can include a graphical user interface window 554 for displaying transcription text 562 associated with the telephonic communication session. A series of control buttons 558 can be included to allow for further operations. To avoid interrupt a presentation of media content at display 508B, a DVR function can be invoked that pauses and records the media content at the time the prompt is presented.

In one embodiment, the media processor device 506A-C can present the prompt on one of the communication devices 502A-D associated with the call. For example, media processor device 506B can present the prompt on the communication device 502B that has been detected as being in the vicinity of the media processor device 506B. In one embodiment, media processor device 506A-C can present the prompt on a communication device 502A-D that is not part of the call. For example, the media processor device 506A can detect communication device 502A as being a part of the call and further detect mobile device 502D as being in the vicinity of the media processor device 506A. The media processor device 506A can present the prompt on the mobile communication device 502D by way of a wireless connection (such as WiFi or Bluetooth). Mobile communication device 502D can be a mobile tablet with, for example, a touch-screen display. In one embodiment, the media processor device 506A-C can present the prompt on a display of a remote control device, not shown, that is associated with the media processor device 506A-C. Presenting the prompt on a display of a communication device other than displays 508A-C avoids an interruption of media content being presented on displays 508A-C.

The offer of transcribing can be accepted, in step 616. The acceptance can be a response entered at the prompt. The acceptance can be a text message or email message from a communication device 502A-D to the media processor device 506A-C. The acceptance can be a button push at the communication device. In one embodiment, the acceptance can be assumed or can be a default action of the media processor device 506A-C. The media processor device 506A-C can have a default state associated with transcription so that all phone messages are automatically transcribed. The media processor device 506A-C be further operative to only stop transcribing upon the termination of a phone call or a command to stop issued by a remote control device, one of the communication devices 502A-C, or a mobile device 502D unrelated to the call.

If the media processor device 506A-D identifies that the transcription offer has been accepted by one of the communication devices 502A-D, in step 616, then in optional step 620, a request is transmitted to obtain permission from another communication device 502A-D engaged in the call to transcribe audio voice data from the call. For example, a call can be initiated and detected between communication device 502A and communication device 502B. Media processor device 506B can detect the presence of communication device 502B in the vicinity of the media processor device 506B. Media processor device 506B can prompt the communication device 502B with an offer to transcribe the phone call. If the offer is accepted, the media processor device 506B can transmit a request for permission to transcribe the call to the other communication device 502A engaged in the call. The requested permission to transcribe the audio voice data can be necessary to prevent inadvertent recording of audio voice data, or transcripts derived therefrom, including material belonging to the calling party. If the media processor device 506A-C determines that the permission for transcription was not granted in optional step 624, then, in step 626, all transcriptions are disabled for audio voice data coming from other communication device 502A.

In step 628, audio voice data is received from one or more of the communication devices 502A-D engaged in the call. In one embodiment, the media processor device 506A-C can receive the audio voice data from one or more of the communication devices 502A-D. The media processor device 506A-C can receive the audio voice data as packet switched data through the gateway 504A-B. The media processor device 506A-C can receive the audio voice data as POTS data. In one embodiment, the media processor device 506A-C can receive audio voice data from a mobile communication device 502D. For example, the audio voice data can be transmitted from the mobile communication device 502D to the mobile communication device 502D by way of a wireless connection (such as WiFi, Bluetooth, or another wireless connection). In one embodiment, the audio voice data is transmitted from the PSTN network 260 though the IMS network 250.

In step 632, the audio voice data is transcribed to generate a text transcription of the call. In one embodiment, audio voice data that has been received by the media processor device 506A-C is transcribed to text by the media processor device 506A-C utilizing speech to text transcription technology. The media processor device 506A-C can transcribe the audio voice data as it is received or can transcribe it in blocks of text. The media processor device 506A-C can be used to transcribe portions of the audio voice data. For example, the media processor device 506A-C can transcribe only audio voice data that is associated with a communication device 502A-D that is not in the vicinity of the media processor device 506A-C.

In step 636, the text transcription is presented from the media processor device 506A-C. In one embodiment, the media processor device 506A-C in the vicinity of the communication device 502A-D can present the text transcription on a display 508A-C that is communicatively coupled to the media processor device 506A-C. The text transcription 550 can include a graphical user interface window 554 for displaying transcription text 562 associated with the telephonic communication session. A series of control buttons 558 can be included to allow for further operations. In one embodiment, the graphical user interface can allow for selection of portions of the text transcription. These portions can be copied and pasted to another window. The graphical user interface can allow for saving of portions of the text transcription to memory in the media processor device 506A-C.

In one embodiment, the media processor device 506A-C can present the text transcription on one of the communication devices 502A-D associated with the call. For example, media processor device 506B can present the text transcription on the communication device 502B that has been detected as being in the vicinity of the media processor 506B thereby avoiding an interruption of a presentation at display 508B. In one embodiment, media processor device 506A-C can present the text transcription on a communication device 502A-D that is not part of the call. For example, the media processor device 506A can detect communication device 502A as being a part of the call and further detect mobile device 502D as being in the vicinity of the media processor device 506A. The media processor device 506A can present the text transcription on the mobile communication device 502D by way of a wireless connection (such as WiFi or Bluetooth). The media processor device 506A-C can present the text transcription on a display of a remote control device, not shown, that is associated with the media processor device 506A-C.

In step 640, a communication device 640 that has previously been determined to be in the vicinity of the media processor device 506A-D can be further monitored to determine if that same communication device 506A-D has subsequently been moved to within the vicinity of a second media processor device 506A-D. For example, communication device 502B can be located in a base unit 504 in the vicinity of a first media processor device 506B when a call initially begins. Subsequently, the communication device 502B can be moved away from the first media processor device 506B and toward a second media processor device 506C. If the communication device 502B is close enough to the second media processor device 506C, then the text transcription can be moved from the first communication device to the second communication device. In embodiment, the second media processor device 506C can determine whether the communication device 502B is present in the vicinity of the second media processor device 506C. The second media processor device 506C can attempt to detect an RFID tag that can be included with the communication device 502B. The RFID tag can be detected by means of a transmitter and an antenna in the second media processor device 506C. If the RFID is detected, then the second media processor device 506C can read identifying information for the communication device 502B. The second media processor device 506A-C can also detect a presence of a communication device by way of determining a received signal strength indication. An antenna and a receiver can be included in the second media processor device 506C and can detect a signal strength emanating from the communication device 502B.

If the second media processor device 506C detects the communication device 502B as being in the vicinity of the second media processor device 502C, in step 640, then it can transmit a signal to the first media processor device 506C to transition the text transcription to the second media processor device 506C, in step 644. In step 648, the first media processor device 506C discontinues presenting the text transcription once the text transcription has been transmitted to the second media processor device 506C.

Upon reviewing the aforementioned embodiments, it would be evident to an artisan with ordinary skill in the art that said embodiments can be modified, reduced, or enhanced without departing from the scope and spirit of the claims described below. For example, in one embodiment, the presentation of the text transcription can be moved from a display 508A-C, to a mobile communication device 502D.

In one embodiment, the presentation of the text transcription can be moved from a display 508A-C to a communication device that is connected to a PSTN network 260.

In one embodiment, the audio voice data that is received at the media processor device 506A-C can be reproduced by the media processor device 506A-C at an audio system of display 508A-C or by the mobile device 502D. In one embodiment, speech to text transcription can be enhanced by recording prior speech to text transcriptions of users. The historical recordings can be associated per user, and can be used to train speech to text transcription technology to enhance speech to text transcriptions during a communication session. For example, when a call is detected a media processor device can detect a caller ID and retrieve a profile of the caller that has been constructed by the speech to text transcription technology over the course of one or more recordings. Such an approach can also be applied to the called party.

As noted earlier the DVR function can be invoked to pause and record media content to avoid interrupting a presentation of media content. Method 500 can be adapted to automatically enable presentation of the media content from the pause state once the transcription is terminated (e.g., by a signal generated by a remote controller) and/or the communication session between first and second communication devices is terminated. Method 500 can also be adapted to operate in whole or in part at the media server device 130 of FIGS. 1, 2 and 5. Other adaptations of method 500 are contemplated by the present disclosure.

Figure 7:
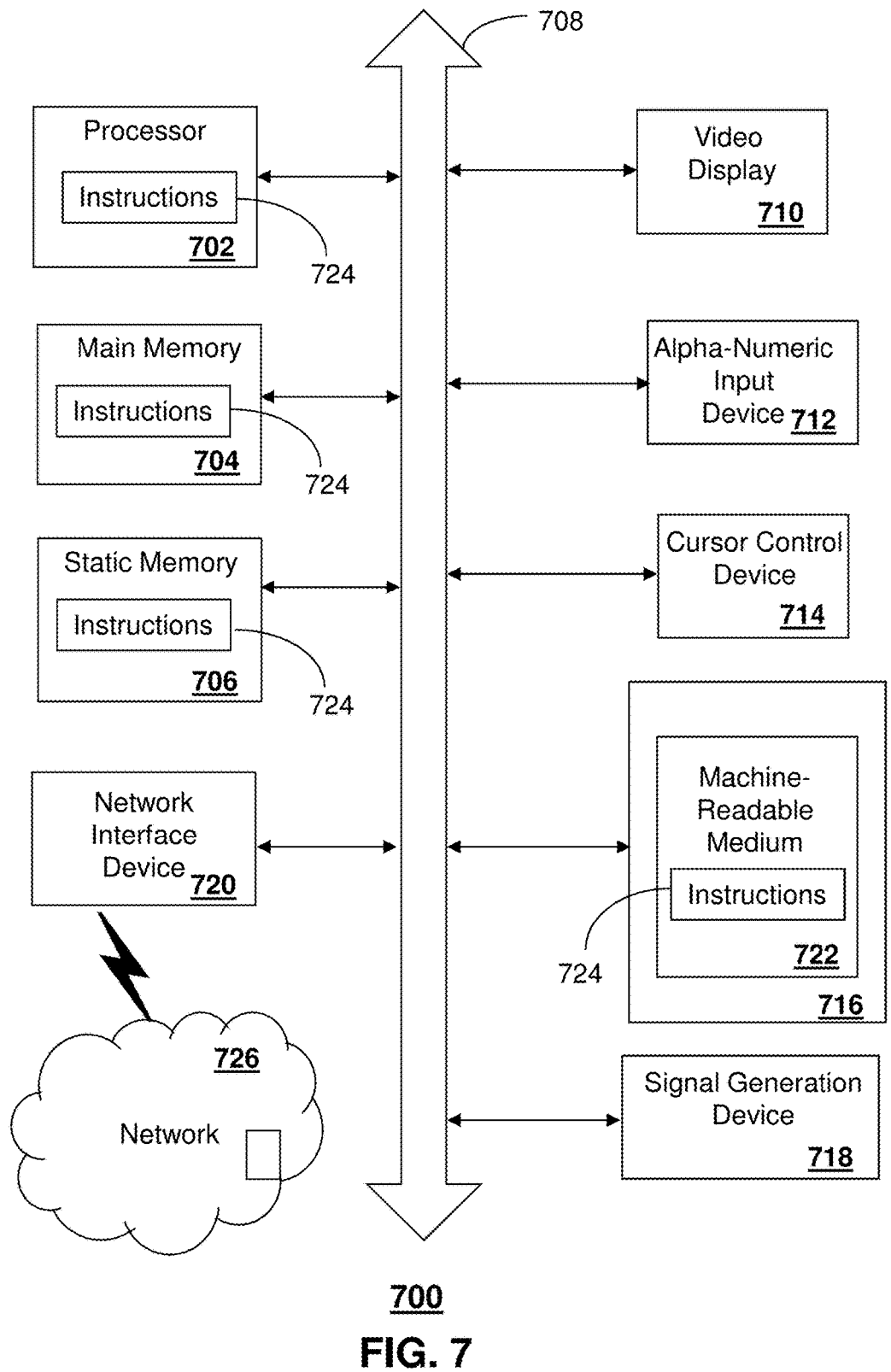
FIG. 7 is a diagrammatic representation of a machine in the form of a computer system within which a set of instructions, when executed, may cause the machine to perform any one or more of the methods discussed herein.

FIG. 7 depicts an exemplary diagrammatic representation of a machine in the form of a computer system 700 within which a set of instructions, when executed, may cause the machine to perform any one or more of the methods discussed above. One or more instances of the machine can operate, for example, as the media server device 130, the media processor 506A-C, the gateway 504A-B, the mobile communication device 516A-H, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal displays (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations comprising:
   determining a presence of a first communication device within a vicinity of a local device, wherein the presence of the first communication device within the vicinity of the local device is due to movement of the first communication device toward the local device, and wherein a textual transcription of a voice call between the first communication device and a second communication device is presented at a first display device; and
   in response to the determining, initiating presentation of the textual transcription of the voice call at a second display device communicatively coupled to the local device.

2. The device of claim 1, wherein the first display device is communicatively coupled to a first media processor and the local device comprises a second media processor.

3. The device of claim 2, wherein the second media processor processes media content received over a communication network for presentation at the second display device, and wherein the operations further comprise:
   receiving a request for the textual transcription; and
   transmitting the textual transcription over the communication network.

4. The device of claim 1, wherein the movement of the first communication device occurs during the voice call.

5. The device of claim 1, wherein the operations further comprise:
   in response to the determining, discontinuing presentation of the textual transcription on the first display device.

6. The device of claim 5, wherein the operations further comprise receiving a request for the textual transcription from the local device, wherein at least one of a providing of the textual transcription to the local device and the discontinuing of the presentation of the textual transcription on the first display device are performed in response to an acceptance of an offer to transcribe an audio portion of the voice call.

7. The device of claim 1, wherein the operations further comprise:
   transcribing an audio portion of the voice call to obtain the textual transcription, wherein the transcribing of the audio portion of the voice call is responsive to receiving an acceptance of an offer to transcribe the audio portion of the voice call.

8. The device of claim 1, wherein the determining is performed by detecting a radio frequency identification device at the first communication device, or by measuring a received signal strength indication from the first communication device.

9. The device of claim 1, wherein the operations further comprise presenting a prompt offering the textual transcription to one of the first communication device, the first display device, the second display device, or a remote control device.

10. A method comprising:
    determining, by a processing system including a processor, a presence of a first communication device within a vicinity of a local device, wherein the presence of the first communication device within the vicinity of the local device is due to movement of the first communication device toward the local device, and wherein a textual transcription of a voice call between the first communication device and a second communication device is presented at a first display device;
    receiving a request for the textual transcription from the local device; and
    in response to the request and in accordance with the determining, initiating presentation of the textual transcription of the voice call at a second display device communicatively coupled to the local device.

11. The method of claim 10, further comprising:
    in response to the determining, discontinuing, by the processing system, presentation of the textual transcription on the first display device.

12. The method of claim 10, further comprising:
    transcribing, by the processing system, an audio portion of the voice call to obtain the textual transcription, wherein the transcribing of the audio portion of the voice call is responsive to receiving an acceptance of an offer to transcribe the audio portion of the voice call.

13. The method of claim 10, wherein the determining is performed by detecting a radio frequency identification device at the first communication device, or by measuring a received signal strength indication from the first communication device.

14. The method of claim 10, wherein the movement of the first communication device occurs during the voice call.

15. A non-transitory machine-readable medium comprising executable instructions that, when executed by a processing system including a processor, facilitate performance of operations comprising:

transcribing an audio portion of a voice call between a first communication device and a second communication device to obtain a textual transcription of the voice call;

determining a presence of the first communication device within a vicinity of a local device, wherein the presence of the first communication device within the vicinity of the local device is due to movement of the first communication device toward the local device, and wherein the textual transcription is presented at a first display device; and in response to the determining, initiating presentation of the textual transcription of the voice call at a second display device communicatively coupled to the local device.

16. The non-transitory machine-readable medium of claim 15, wherein the first display device is communicatively coupled to a first media processor and the local device comprises a second media processor.

17. The non-transitory machine-readable medium of claim 16, wherein the second media processor processes media content received over a communication network for presentation at the second display device, and wherein the operations further comprise:

receiving a request for the textual transcription; and transmitting the textual transcription over the communication network.

18. The non-transitory machine-readable medium of claim 15, wherein the operations further comprise:

in response to the determining, discontinuing presentation of the textual transcription on the first display device.

19. The non-transitory machine-readable medium of claim 15, wherein the operations further comprise presenting a prompt offering the textual transcription to one of the first communication device, the first display device, the second display device, or a remote control device.

20. The non-transitory machine-readable medium of claim 15, wherein the movement of the first communication device occurs during the voice call.

\* \* \* \* \*